Dec. 3, 1968  G. H. ARNOLD  3,413,874

SHAFT-COUPLING MECHANISMS

Filed Sept. 7, 1966  2 Sheets-Sheet 1

INVENTOR
GEORGE HENRY ARNOLD
BY Kinchelen, Kinchelen & Oltega
ATTORNEYS

Dec. 3, 1968  G. H. ARNOLD  3,413,874
SHAFT-COUPLING MECHANISMS
Filed Sept. 7, 1966  2 Sheets-Sheet 2

INVENTOR
GEORGE HENRY ARNOLD
BY
ATTORNEYS

United States Patent Office 3,413,874
Patented Dec. 3, 1968

3,413,874
SHAFT-COUPLING MECHANISMS
George Henry Arnold, Havant, England, assignor to The General Electric Company, Limited, London, England, a British Company
Filed Sept. 7, 1966, Ser. No. 577,791
2 Claims. (Cl. 74—822)

ABSTRACT OF THE DISCLOSURE

A shaft coupling mechanism including a drive member which drives an intermittently driven member in which means is included to substantially overcome backlash in the motion of the driven member. The mechanism includes a driven member mounted for rotation about an axis with a face of said driven member transverse to the axis, said face having a plurality of radial channels. The mechanism further includes a driving member mounted for rotation about a further axis parallel to and displaced from the axis of the driven member. The driving member includes a peg which upon rotation of said driving member enters the inner end of one of said channels in a first rotational position of the channel and leaves the inner end of that channel in a second rotational position of the channel. The driven member thereby is driven intermittently by engagement between said peg and a wall of each channel in turn, as the driving member rotates continuously. The mechanism also includes locking means that is operative when engaged to prevent rotation of the driven member. Lastly the mechanism includes a spring controlled by the driving member to urge the locking means into a locking position during periods of lost motion of the driving member.

---

This invention relates to shaft-coupling mechanisms. It is a feature of most such mechanisms that there is a certain amount of backlash in the coupling and this is generally tolerated as being preferable to the expensive alternative of high precision manufacture. In continuous motion drives backlash may, in any case, be unobjectionable, but in intermittently driven members the backlash effect will be apparent in every change in the motion.

An object of the present invention is therefore to provide means for substantially overcoming backlash in the motion of an intermittently driven rotary member.

According to the present invention, a shaft-coupling mechanism comprises a first rotary member, a second rotary member arranged to engage the first member, the members being adapted so that continuous rotation of the first member causes intermittent rotation of the second member, and a locking member which is controlled by the first member so as to be spring biased into engagement with the second member during periods of lost motion of the first member.

The locking member is preferably controlled by a cam on or constituted by the first member.

Figure 1:
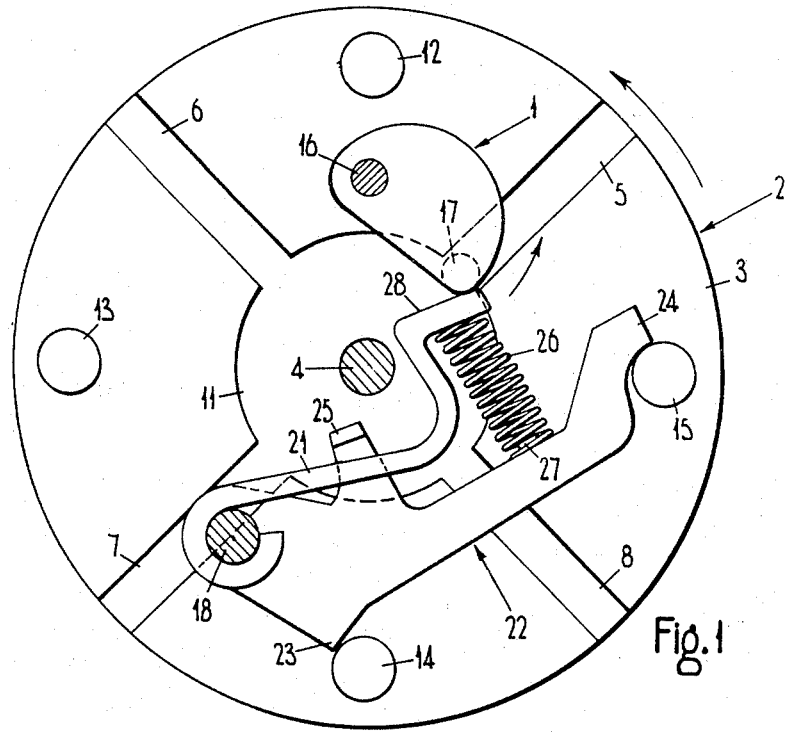
Figure 2:
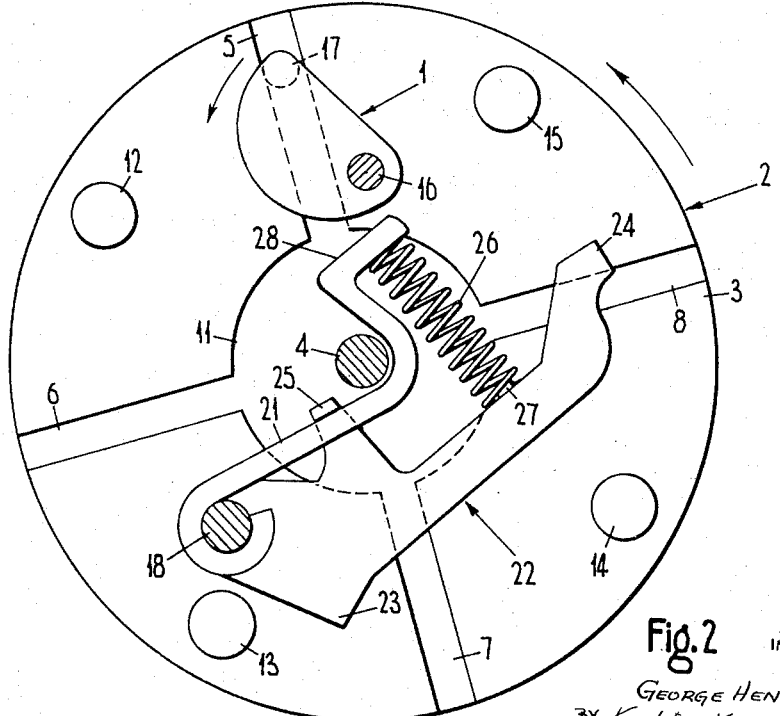
Figure 3:
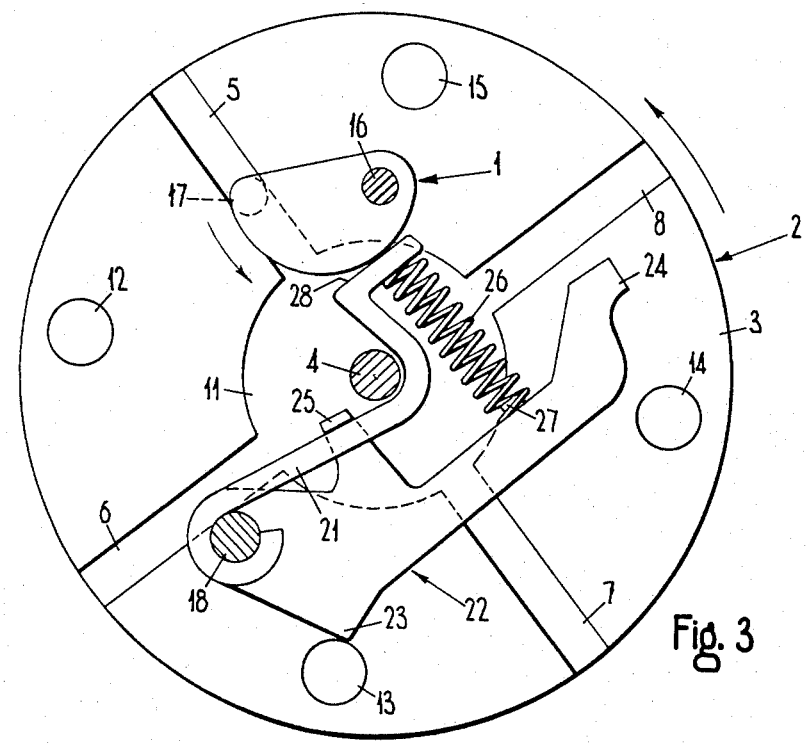
Figure 4:
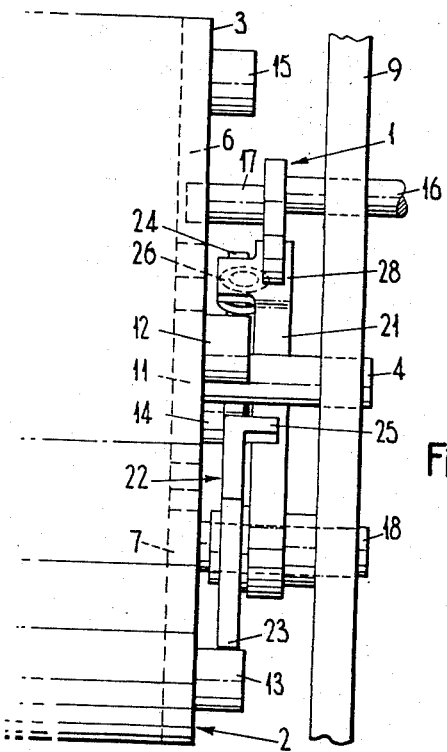

A shaft-coupling mechanism in accordance with the present invention, and as employed in a turret tuner for a radio transmitter and/or receiver, will now be described by way of example with reference to the accompanying drawings of which FIGURES 1, 2 and 3 are end elevations of the mechanism in various stages of the coupling cycle and FIGURE 4 is a partial front elevation of the turret and mechanism.

A number of alternative tuned circuits are mounted on a turret, that is, a cylindrical chassis, so that a selected tuned circuit may be "switched in," that is, connected to the remaining circuitry, by rotating the turret until the selected circuit is positioned between switching contacts. Such a switching arrangement is advantageous where wiring path lengths are critical.

In the present application the turret is motor driven through a speed reducing gear train. The final member of the gear train is mounted on a shaft on which is also mounted the driving member of the shaft-coupling mechanism, this driving member constituting the first member in the invention as claimed.

Referring to the drawings, only the turret and the driving member, of the above items are shown. The turret 2 is shown in end view in FIGURES 1–3 in which it appears as a circular plate, while the driving member 1 is an approximately semicircular cam adjacent the face 3 of the turret 2. The turret 2 is mounted on a shaft 4 which may be considered as one of the shafts to be coupled. In the face 3 of the turret 2, four radial channels 5, 6, 7 and 8 extend into a central recessed portion 11 so leaving four upstanding quadrant portions separated by the channels.

Four abutment members, i.e., bosses 12, 13, 14 and 15, are mounted symmetrically around the face 3 and towards the periphery of it. The turret 2 is required to be locked in a selected one of four positions corresponding to four switched conditions of the associated circuitry. In each of the four positions of the turret 2 the bosses 12, 13, 14 and 15 are positioned on the vertical and horizontal centre lines, the four such positions of each boss corresponding to the four turret positions.

On a shaft 16 is mounted the driving member 1. The shaft 16 may be considered as the other of the shafts to be coupled by the mechanism and is mounted in a supporting bearing in a mounting plate 9. The shaft 16 is positioned so that when the turret 2 is as shown in FIGURE 1 the shaft 16 is symmetrically disposed between the two channels 5 and 6 and also lies on the intersection of the tangents to the circular portion 11 at the inner ends of channels 5 and 6. A driving pin 17 is mounted on the driving member 1 to project transversely to the plane of rotation of the driving member and engage one or other of the channels adjacent the shaft 16. The driving pin 17 is so placed relative to the shaft 16 that in FIGURE 1 it could freely enter either of the adjacent channels 5 and 6 if under no other constraint.

As previously mentioned the driving member 1 is a semicircular cam plate the shaft 16 and pin 17 being positioned approximately at the ends of the diameter.

Mounted in a bearing in the mounting plate 9 is a shaft 18 on which an actuating member 21 and a locking member 22 are each freely mounted. The locking member 22 is a flat arm which can rotate in its own plane, i.e. parallel to the face 3. The member 22 can rotate from a locking position in which rotation of the drum 2 is prevented to a free position in which the drum is free to rotate. The locked position is shown in FIGURE 1 and the free position in FIGURE 2. The locking member 22 is shaped to abut against two of the bosses 12, 13, 14 and 15 in the locked position. A heel portion 23, as shown in FIGURE 1, abuts against boss 14, so preventing clockwise rotation of the drum 2, and a toe portion 24 abuts against boss 15 to prevent anticlockwise rotation. The locking member 22 is also so shaped at the heel and toe portions 23 and 24 that if the locking member is not constrained into the locking position, rotation of the drum 2 in the anticlockwise direction will cause the bosses 14 and 15 to push the locking member aside and into the free position.

Positioned on the side of the locking member 22 opposite the heel and toe portions 23 and 24 is an upturned stop member 25. The actuating member 21 is biased against this stop member 25 by a compression spring 26 the other end of which is located on a spigot 27 on the locking member 22.

Apart from restrictions imposed by the bosses 12–15, the locking member 22 and actuating member 21 are free to rotate as a unit on the shaft 18. The actuating member 21 is shaped to skirt the shaft 4 on which the drum is mounted and to provide a cam-follower surface 28 at its end remote from the shaft 18. The shaft 4 provides a stop for rotation of the unit, comprising members 21, 22 and spring 26, in anticlockwise direction.

The operation of the coupling is as follows. The driving shaft 16 is driven by gearing, not shown, in an anticlockwise direction. As shown in FIGURE 1 the driving pin 17 is on the point of entering the channel 5. The semicircular edge of the driving member 1 is also on the point of leaving the cam-follower surface 28 of the actuating member 21. In the position shown the locking member 22 is biased into contact with the bosses 14 and 15 by the spring 26 which is compressed by the actuating member 21. This actuating member 21 can be seen to be out of contact with the stop member 25 of the member 22.

Rotation of the driving pin 17 releases the actuating member 21 which, under the compression of the spring 26 moves upwardly until it engages the stop member 25. The assembly 21, 22 then remains stationary as the driving pin 17 moves into the channel 5. When the driving pin 17 engages the lead wall of the channel 5 the drum 2 commences to rotate. The boss 15 moves upwardly pushing the member 22 out of its path, the actuating member 21 also moving with the arm 22. The pin 17 continues to drive the drum 2 around bearing on the leading wall of the channel 5 as it does so. In FIGURE 2, the member 22 and actuating member 21 have been moved by the boss 15 completely into the free position in which the actuating member 21 engages the shaft 4. Neither the heel portion 23 nor the toe portion 24 will then obstruct the passage of following bosses.

Rotation of the drum 2 progresses from FIGURE 2, until, in FIGURE 3 (to which FIGURE 4 corresponds) the cam surface of the driving member 1 just engages the cam-follower surface 28 of the actuating arm 21. The boss 13 is then positioned under the heel portion 23 which is biased against the boss 13 as the spring 26 is compressed. With further rotation of the drum 2 the boss 13 slides out from under the heel portion 23 allowing the member 22 to be biased downwardly into the locking position.

The driving pin 17 exits from the channel 5 just prior to the attainment of the locking position, the drum 2 then not being driven and the subsequent motion of the driving member 1 (prior to entry of pin 17 into the next channel) being "lost" motion.

The boss 15 has been moved, in the operation just described, through one quarter of a revolution from the position shown in FIGURE 1. Continued rotation of the driving member 1 will similarly establish the successive positions of the drum 2.

As mentioned, the driving shaft 16 is driven by motor through a gear train. A particular position of the turret 2 may be selected by operation of a pair contacts (not shown) associated with each turret position and mounted on the driving shaft 16 so as to be operated early in the lost motion condition. The inertia of motor and gear train would not then be significant. To select a particular turret position, a particular pair of the contacts are made operative and that pair disconnects the motor supply.

The invention provides the advantage of positive positioning of an intermittently driven shaft without the necessity for very high accuracy manufacture that would be necessary in a conventional Geneva mechanism for example.

Clearly the invention is applicable to any shaft-coupling mechanism where positive position is important.

I claim:
1. A shaft coupling mechanism comprising a driven member mounted for rotation about an axis and having a face transverse to said axis, with a plurality of radial channels in said face, a driving member mounted for rotation about a further axis parallel to and displaced from the first said axis, the driving member comprising a peg which, on rotation of said driving member, enters the inner end of one of said channels in a first rotational position of the channel and leaves the inner end of that channel in a second rotational position of the channel, the driven member being driven intermittently by engagement between said peg and a wall of each channel in turn as said driving member rotates continuously, locking means operative when engaged to prevent rotation of the driven member, and spring means urged by said driving member to urge said locking means into a locking position during periods of lost motion of said driving member.

2. A shaft coupling mechanism comprising a first shaft, a driving member mounted on the first shaft for rotation by the shaft, a second shaft, a driven member mounted for rotation with the second shaft, intermittent drive means including said driving and driven members whereby the driven member is driven intermittently by continuous rotation of the driving member, locking means operative when engaged to prevent rotation of the driven member, spring means urged by said driving member to urge said locking means into a locking position during periods of lost motion of said driving member.

References Cited

UNITED STATES PATENTS

| | | | |
|---|---|---|---|
| 1,871,414 | 8/1932 | Liss | 74—820 |
| 2,086,850 | 7/1937 | Bullard | 74—820 |

MILTON KAUFMAN, *Primary Examiner.*